United States Patent [19]

Machida et al.

[11] 3,820,581
[45] June 28, 1974

[54] MULTIPLE EFFECT EVAPORATOR APPARATUS

[75] Inventors: Shunichi Machida; Masaharu Tsujita; Shintaro Nakaya; Ryoji Ueno, all of Tokyo, Japan

[73] Assignee: Ebara Manufacturing Co., Ltd., Tokyo, Japan

[22] Filed: Feb. 16, 1973

[21] Appl. No.: 333,035

[30] Foreign Application Priority Data
Feb. 16, 1972 Japan................................ 47-16122

[52] U.S. Cl................... 159/13 A, 159/18, 202/236, 202/174
[51] Int. Cl......... B01d 1/26, B01d 3/02, B01d 1/22, B01d 3/08
[58] Field of Search.................. 159/13 R, 13 A, 18; 202/174

[56] References Cited
UNITED STATES PATENTS

| | | | |
|---|---|---|---|
| 378,843 | 2/1888 | Lillie | 159/13 A X |
| 411,012 | 9/1889 | Chapman | 159/17 R |
| 643,794 | 2/1900 | Harvey | 159/18 |
| 1,783,464 | 2/1930 | Follain | 62/152 |
| 2,753,932 | 7/1956 | Eckstrom et al | 159/13 A |
| 2,758,061 | 8/1956 | Geller | 202/236 X |
| 3,412,778 | 11/1968 | Witt et al | 159/13 A |
| 3,481,835 | 12/1969 | Carnavos | 159/13 A UX |
| 3,487,873 | 1/1970 | Bromley et al. | 159/13 A |
| 3,627,646 | 12/1971 | Osdor | 159/18 X |

FOREIGN PATENTS OR APPLICATIONS

| | | | |
|---|---|---|---|
| 893,633 | 4/1962 | Great Britain | 159/13 A |
| 1,206,643 | 9/1970 | Great Britain | 159/13 A |

*Primary Examiner*—Jack Sofer
*Attorney, Agent, or Firm*—Oblon, Fisher, Spivak, McClelland & Maier

[57] ABSTRACT

A multiple effect evaporator apparatus features a plurality of vertically arranged evaporator chambers, each having a plurality of vertically oriented heat exchange tubes molded at their lower ends to a bottom plate of the chamber and supporting a vessel at their upper ends, said vessel being adapted to receive a solution from an upper chamber, an overflow tube of substantially U-shaped configuration connected at one end to an upper part of the vessel and at the other end being open to the pressure of the next lower chamber, and means for maintaining a pressure difference between the respective chambers.

5 Claims, 2 Drawing Figures

MULTIPLE EFFECT EVAPORATOR APPARATUS

BACKGROUND OF THE INVENTION

1. Field of the Invention

This invention relates to a multiple effect evaporator apparatus for evaporating and condensing a solution, which is equipped to a chemical or other plant.

2. Description of the Prior Art

In conventional multiple effect evaporator apparatus of the type having a plurality of vertically oriented heat exchange tubes disposed in each of two or more evaporator chambers arranged above and below one another with each having a vessel for receiving a solution wherein the upper ends and the lower ends of the heat exchange tubes are each respectively mounted to plates of the adjacent chambers, the difference of pressure levels between the top evaporation chamber and the bottom evaporation chamber provides the force for passing the solution through pressure controlling means of each of the chambers.

The pressure reducing function of the different pressure controlling means causes a difference of pressure in each of the chambers, and contributes to attain effective multiple evaporation in normal operation. However, the temperature of the solution is low at the initiation of operation so that the saturated vapor pressure of the solution being supplied is substantially the same as that of the solution at the temperature of the coolant in the bottom chamber, whereby a difference of pressures in the various evaporator chambers is not caused and the pressure reducing function of the different pressure controlling means prevents the flowing of the solution in the heat exchange tubes.

If the heating of the chambers is initiated without a sufficient amount of the solution flowing down through the tubes to wet the inner walls of the heat exchange tubes, the heat exchange tubes will be damaged by heating. Accordingly, the different pressure controlling means interrupt the operation.

In the conventional multiple effect evaporator apparatus, a required flow of the solution is supplied to the heat exchange tubes by the liquid pressure achieved by increasing the depth of the solution in the vessel. However, it has been found that more than 3 meters of depth of the solution in the vessel is required in the case where the maximum temperature of the solution is about 120°C and the effective steps are about 10 in number. However, the length of the heat exchange tubes is usually about 3m. Accordingly, the depth of the vessel is substantially the same as the length of the heat exchange tube, so as to occupy similar space, which is quite uneconomical, whereby remarkably expensive construction cost of the apparatus is required.

Moreover, it is difficult to control the evaporation capacities of the chambers, so that the solution overflows into the condensed water because of flow rate control difficulty and a safe operation cannot readily be expected.

SUMMARY OF THE INVENTION

Accordingly, it is an object of the present invention to provide an improved multiple effect evaporator apparatus which can be safely operated without any trouble at the initiation of operation and can keep a suitable differential pressure so as to improve the coefficient of evaporation.

It is another object of this invention to provide an economical and compact multiple effect evaporator apparatus wherein evaporation effects of the chambers can be easily controlled so as to increase the range of control of amounts of evaporation and to decrease the depth of the vessel.

These objects and others are attained by the multiple effect evaporator apparatus of the present invention which comprises a plurality of vertically arranged evaporator chambers, a plurality of thin film flow-down type vertically oriented heat exchange tubes being mounted to an upper plate at the top ends and to a bottom plate at the lower ends thereof for increasing the evaporation coefficient in each of the evaporator chambers, a vessel for receiving a solution disposed above each of the upper plates, a U-shaped overflow tube in each chamber having one end thereof connected to an overflow outlet of the vessel controlling the depth of solution therein and thus open to an upper chamber so as to be subject to the upper chamber pressure and the other end being connected to the upper plate as an outlet of the solution from the overflow tube and thereby being open to the pressure of the next lower chamber, whereby an overflow from each vessel to its respective bottom plate is prevented so as to prevent a contamination of the resulting condensate with the solution with the U-shaped overflow tubes receiving the solution under differential heads so as to overflow the solution regardless of the pressure difference in each of the chambers.

In accordance with the multiple effect evaporator apparatus of the present invention, an excess of the solution flows down to the next lower chamber through the U-shaped overflow tube so as to prevent overflow of the solution from the vessel to the bottom of the evaporator chamber and so as to maintain the pressure difference between the upper chamber and the lower chamber by forming a U-shaped fluid column. The term of "U-shaped" tube in the context of this disclosure means any form of tube having a U-shaped or a V-shaped liquid column which maintains different pressures between one end and the other end of the tube. Accordingly, the tube can be of such shapes as shown below:

BRIEF DESCRIPTION OF THE DRAWINGS

Various other objects, features and attendant advantages of this invention will be more readily appreciated as the same becomes better understood from the following detailed description, when considered in connection with the accompanying drawings, wherein.

DESCRIPTION OF THE PREFERRED EMBODIMENTS

Figure 1:
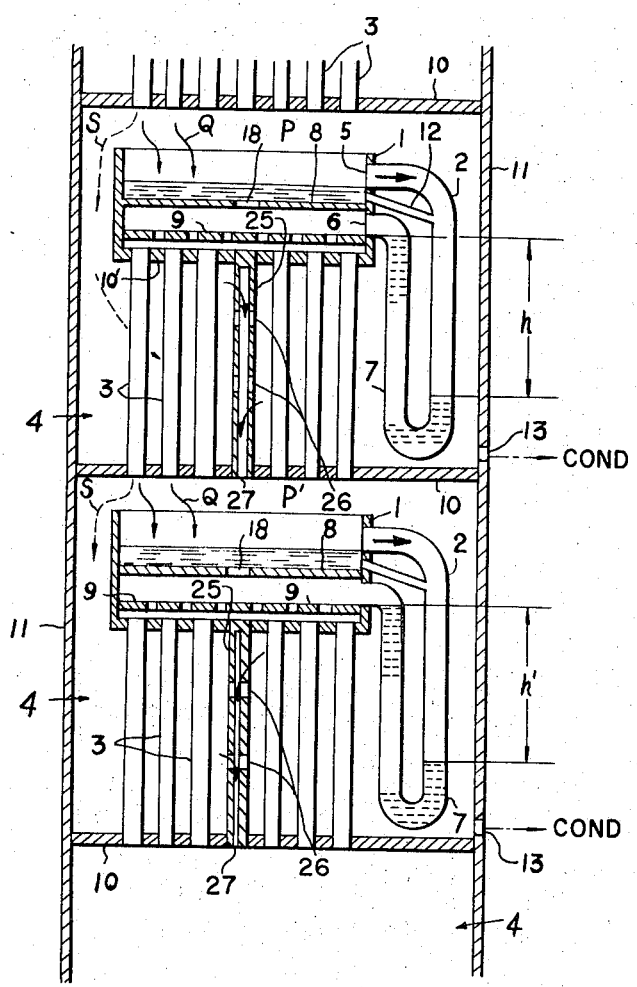
FIG. 1 is a sectional elevational view of one embodiment of a multiple effect evaporator apparatus according to this invention.

Referring now to the drawings, wherein like reference numerals designate like or corresponding parts throughout the several views, and more particularly to FIG. 1, a plurality of vertically disposed evaporator chambers 4 are separately formed by dividing a casing 11 with horizontal plates 10 so as to form the multiple effect evaporator apparatus.

A plurality of heat exchange tubes 3 are vertically arranged in each of the chambers 4 being open at the lower ends thereof through the respective plates 10. Above the heat exchange tubes 3, a vessel 1 for receiving a solution is mounted thereto through a plate 10′, being equipped with a pressure difference maintaining means in the form of a dividing wall 8 having a resistant orifice 18 therein and a solution distributing means in the form of an apertured wall 9 arranged beneath the wall 8 and above the plate 10′, through which the upper ends of the heat exchange tubes 3 open.

An overflow output 5 is formed in the vessel 1 at a place controlling the depth of the solution therein so as to keep the upper chamber pressure. An overflow tube 2 connected at one end to the overflow outlet 5 has a U-shaped configuration so as to keep the solution as a U-shaped liquid column 7, and an overflow outlet 6 at the other end of the overflow tube 2 is connected to the lower plate 10′ of the vessel 1 through the apertured wall 9, so as to be open therethrough via the vertical heat exchange tubes 3 to the next lower chamber 4, so as to have the lower chamber pressure.

A part of the solution Q received in the vessels flows down through the resistant orifice 18 to the next lower chamber, and is reduced in pressure when it passes through the resistant orifice, to provide the difference of pressure. All of the remainder of the solution Q received in the vessel 1 above the wall 8 flows through the overflow tube 2 to the lower part of the vessel 1 between the wall 8 and the wall 9, and the U-shaped liquid column 7 is thus formed therebetween.

Figure 2:
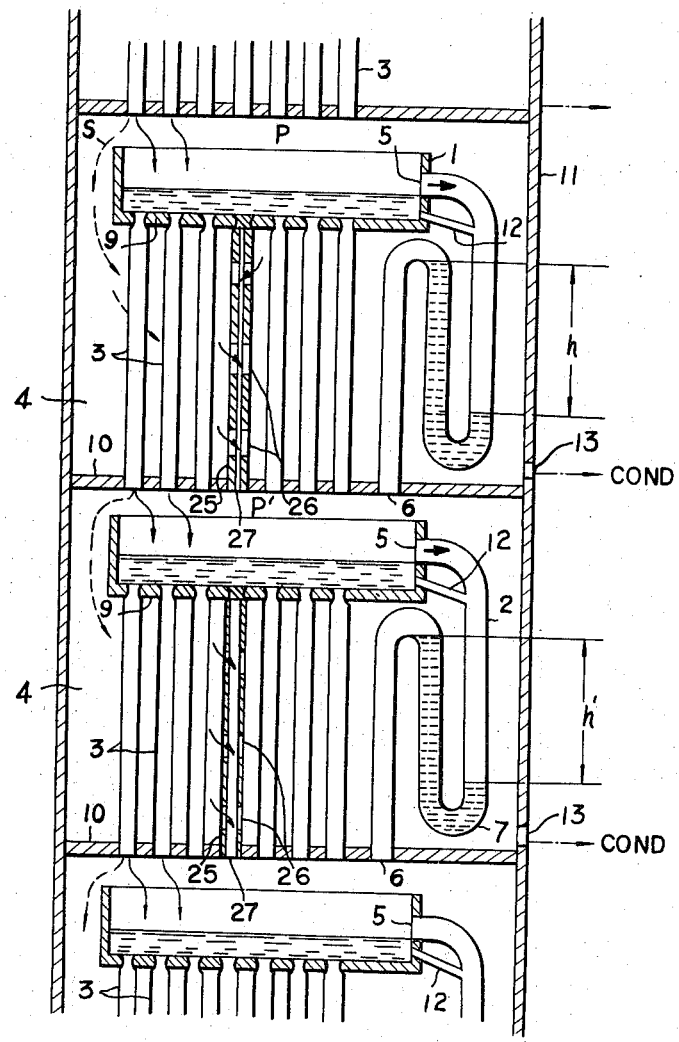
FIG. 2 is a sectional elevational view of another embodiment of the apparatus according to this invention.

In FIG. 2, where another embodiment of the multiple effect evaporator apparatus is shown, a pressure difference maintaining means is connected to a solution distributing means as an integral body, so that the pressure reducing and solution distributing means 9 is formed at the inlets of the heat exchange tubes 3. The output 6 of the overflow tube 2 in this case is placed above the vessel 1 of the next lower evaporation chamber 4.

In accordance with this embodiment, most of the solution Q is supplied by passing through the pressure reducing and solution distributing means 9 to the heat exchange tubes 3 in a normal operation. Only an amount of the solution necessary for keeping the solution in the U-shaped tube 7 is supplied through a capillary tube 12 for supplying a pressure sealing solution. Thus, the overflow tube 2 is operated as a safety device when the height of the solution rises because of trouble in controlling the flow rate of solution Q at the initiation of operation. Accordingly, it is a quite effective system for increasing safety compared with the conventional vertical type evaporator apparatus.

Also, in FIG. 2, the reference numeral 13 designates an outlet of condensed water; Q designates an original solution; S designates a vapor; P and P′ designate pressure in each of the vapor chambers; and h and h′ designate the differences of head in the U-shaped tubes 2 of an upper and lower chamber 4 for maintaining different pressure therein.

In order to control the vapor pressures in each of the evaporator chambers of the preferred embodiments of this invention and to increase the heat exchange coefficient of the heat exchange tubes, it is possible to form a noncondensed gas passage from the upper evaporation chamber to the lower evaporation chamber. This noncondensed gas passage can be a vertical tubular member 25 arranged between plates 10 and the lower plates of the vessels 1 having a plurality of fine holes 26 therein and a bottom opening 27 and is preferably placed at the center of the chamber or a side of the chamber being opposite to the upper passage of vapor from the lower ends of the heat exchange tubes of the upper chamber, whereby a portion of the vapor is uniformly contacted to the heat exchange tubes 3 in the evaporation chamber, and the stay of noncondensed gas is removed from around said heat exchange tubes and permitted to move as indicated by the arrows to the next lower evaporation chamber.

In accordance with the vertical multiple effect evaporator apparatus shown in FIG. 1, the vapor S evaporated in an upper evaporator chamber is supplied to the evaporator chamber 4 around the heat exchange tubes 3 and is used as a heat source for the next lower evaporator chamber and the unevaporated solution Q is supplied to the vessel 1 in the lower evaporator chamber flowing down through the heat exchange tubes 3 through the pressure difference maintaining means 8 and the solution distributing means 9. When the solution Q is passed through the pressure difference maintaining means 8, the pressure is reduced so that the solution in the lower evaporator chamber is evaporated and condensed at a lower temperature than the solution in the upper evaporator chamber. In normal operation, the solution Q heated at the top evaporator chamber is evaporated until reaching saturated vapor pressure at the corresponding temperature so that the pressure is maintained.

On the other hand, the vapor in the bottom evaporator chamber is condensed by cooling with a coolant water so that the vapor pressure corresponds to the cooling effect of the coolant water.

The pressure difference resulting from the difference of saturated pressures in the top chamber and the bottom chamber provides the power source and a predetermined rate of solution passes through each pressure difference maintaining means 8 in each chamber, so that the pressure differences in the chambers are caused by the pressure reducing function. The temperature of the solution is decreased by evaporation so that the saturated vapor pressure is changed in each chamber and is balanced by the pressure reducing function, thereby holding the normal operation.

A part of the solution Q received on the pressure difference maintaining walls 8 is passed through the resistance orifices 18 and the remainder of the solution Q is supplied through the overflow outlet 5, to the overflow tube 2 to form the U-shaped solution column 7 therein.

The difference of heads h of the U-shaped solution column is changed so as to compensate for the pressure difference between the upper part and the lower part of the pressure difference maintaining means 8. The following equation is given $$P - P' = \gamma \times h$$

wherein $P$ designates the pressure of the upper chamber, $P'$ designates the pressure of a lower chamber and $\gamma$ designates specific gravity of the solution. $P$, $P'$ and $h$ are in meters.

When the solution is supplied to the right end of the U-shaped solution column, the right end tends to rise so as to decrease h, but the solution flows down from the left end to the lower part of the vessel below the pressure difference maintaining means 8 corresponding to the amount of solution supplied, whereby the difference of head h is maintained and the pressure difference (P–Po) is not affected, Po being an original pressure.

The solution Q flows down through the overflow tube 2 and is added to the solution passing through the resistance orifices 18 of the pressure difference maintaining means 8 and uniformly flows down through the distribution means 9 into the heat exchange tubes 3. The amount of solution passing through resistance orifices 18 is dependent upon the pressure difference (P-Po) and the depth of the solution in vessel 1. The depth of the solution is constant and is not affected by a change of the feed rate of the solution Q, because of the overflow tube 2.

Accordingly, the amount of solution passed through the resistance orifices of the pressure difference maintaining means 8 is dependent upon only the pressure difference P–Po, and thus is decided by the saturated vapor pressures at the temperatures of the solutions in the top chamber and in the bottom chamber. The pressure difference in the multiple effect evaporator apparatus system is distributed to be proportional to each pass resistance of the pressure difference maintaining means 8 in each chamber. The pressure difference P–P′ between adjacent chambers has close connection to the evaporation coefficient of each chamber.

Further, in accordance with the multiple effect evaporator apparatus of this invention, the pressure differences P–P′ between adjacent chambers and the evaporation coefficient of each chamber can be controlled by selecting the temperature of the solution in the top chamber, so that the control system is quite simple.

Also, any excess of solution flows down through the overflow tube, so that the overflow of the solution from the vessel to the bottom of the evaporator chamber is prevented, and the rate of solution flow can be changed in a wide range without affecting the depth of the solution in the vessel and the pass resistance of the pressure difference maintaining means by forming U-shaped solution column in the overflow tube so as to maintain the pressure difference.

Furthermore, the evaporation coefficient of each chamber can be easily controlled so as to increase the range of control of the rate of evaporation, and the depth of solution in the vessel can be remarkably decreased so that the construction cost of the apparatus can be decreased. It is also possible to prevent excess rise of the surface of the solution in the vessel placed above the heat exchange tubes caused by a change of the rate of flow of solution and the pressure difference, whereby the contamination of the condensed water with the solution overflowing from the vessel by the excess rise, can be prevented, and a safe operation is kept even though flow rate difficulty occurs. The evaporation coefficient is improved without any deterioration of the function of evaporation and the control of each of the evaporator chambers is remarkably simplified and the maintenance of the apparatus is simple.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A multiple effect evaporator apparatus which comprises:
   a plurality of evaporator chambers disposed in vertical alignment;
   a plurality of thin falling internal film type vertically oriented heat exchange tubes for increasing evaporation coefficient in each of said evaporator chambers;
   said heat exchange tubes being moulded to an upper plate at the top ends and to a bottom plate at the lower ends thereof;
   a vessel for receiving a solution place above said upper plate in each of said chambers;
   pressure difference maintaining means for causing difference of pressure between said evaporator chambers;
   a U-shaped overflow tube having one end thereof connected to an overflow outlet of said vessel above said pressure difference maintaining means at a place controlling the depth of said solution and being open to an upper chamber so as to keep the upper chamber pressure, and the other end of said tube being connected to a lower part of said vessel below said pressure difference maintaining means as an outlet of said solution from said overflow tube so as to keep the lower chamber pressure, whereby an overflow from said vessel to said bottom plate of the respective chamber prevents contamination of the resulting condensate with said solution; and said overflow tube receiving said solution under differential heads so as to overflow said solution, regardless of the pressure difference in each chamber.

2. The multiple effect evaporator apparatus according to claim 1, wherein said one end of said U-shaped overflow tube is connected to the vessel above the upper plate connecting the top ends of said heat exchange tubes.

3. The multiple effect evaporator apparatus according to claim 1, wherein said pressure difference maintaining means is formed at the bottom of said vessel and a solution distributing means is placed therebelow and above the upper plate connecting the top ends of said heat exchange tubes.

4. The multiple effect evaporator apparatus according to claim 1, further comprising a noncondensed gas passage from the upper evaporation chamber to the next lower evaporation chamber, whereby a portion of the vapor contacting said heat exchange tubes is passed to the next lower evaporation chamber.

5. The multiple effect evaporator apparatus according to claim 1, wherein a capillary tube for supplying a pressure sealing solution in the U-shaped overflow tube is connected between the vessel and the overflow tube.

* * * * *